Nov. 12, 1929.  F. H. MEYER ET AL  1,735,290
DUAL TIRE WHEEL STRUCTURE
Filed Aug. 14, 1925  2 Sheets-Sheet 1

INVENTOR
FRANK H. MEYER
FRED R. KLAUS
By Lloyd L. Evans ATTORNEY

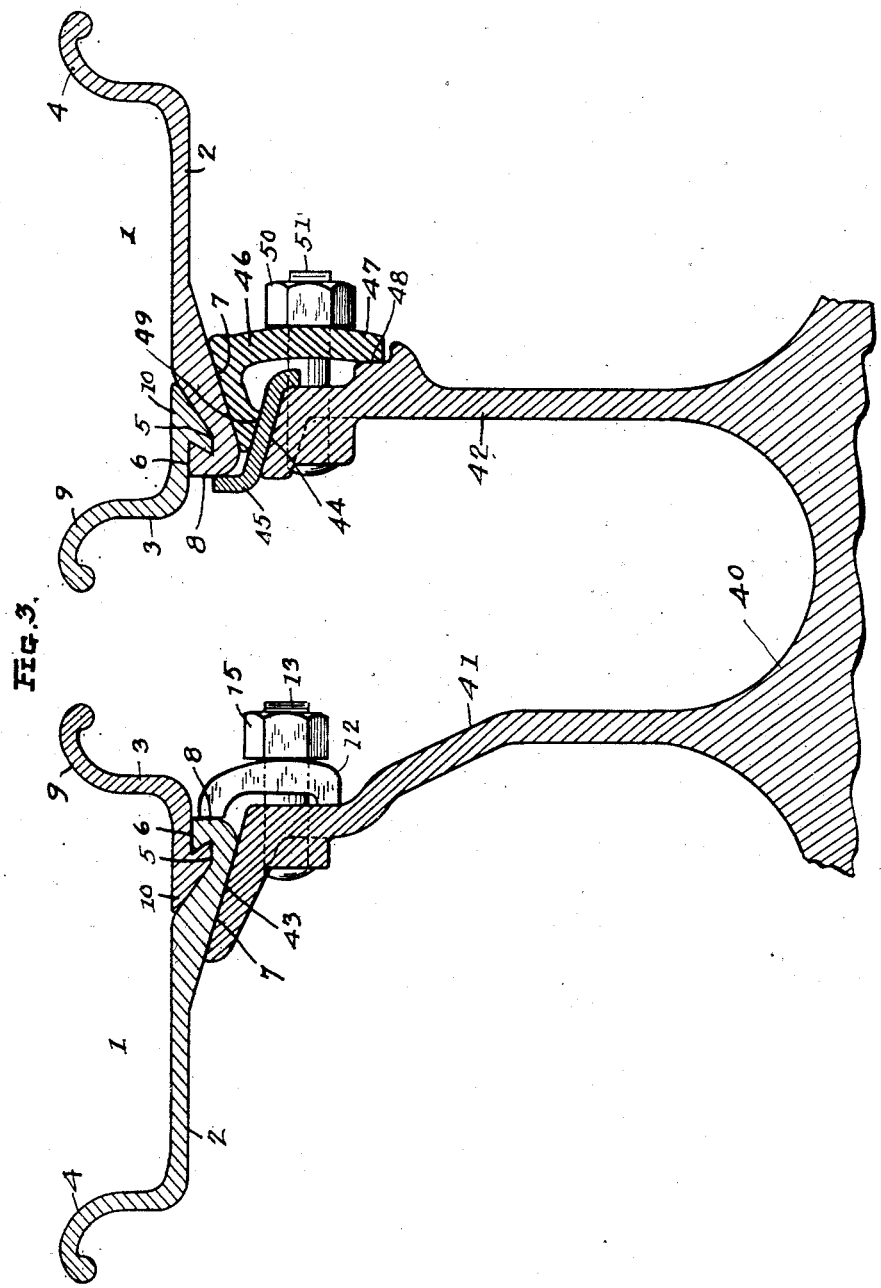

Patented Nov. 12, 1929

1,735,290

UNITED STATES PATENT OFFICE

FRANK H. MEYER AND FRED R. KLAUS, OF WARREN, OHIO, ASSIGNORS, BY MESNE ASSIGNMENTS, TO THE GOODYEAR TIRE & RUBBER COMPANY, OF AKRON, OHIO, A CORPORATION OF OHIO

DUAL-TIRE WHEEL STRUCTURE

Application filed August 14, 1925. Serial No. 50,214.

This invention relates to wheels of the dual tire type, and more particularly to means for securing tire-carrying rims thereto.

An object of our invention is to provide a dual felly and rim assembly in which each tire-carrying rim is supported from a circumferential seat disposed substantially to one side of the median plane of the rim regardless of the lateral width of the rim.

A further object of this invention is to provide a dual wheel structure wherein the median plane of each tire-carrying rim is substantially outside laterally of the rim seating faces of the wheel structure.

An additional object of this invention is to provide an adapter ring for use in mounting rims on dual tire wheel structures that definitely and positively positions the rim laterally with respect to the wheel structure.

Other objects and advantages to be obtained from practicing this invention will be apparent from a consideration of the accompanying drawings and the following description relating thereto.

Figure 1:
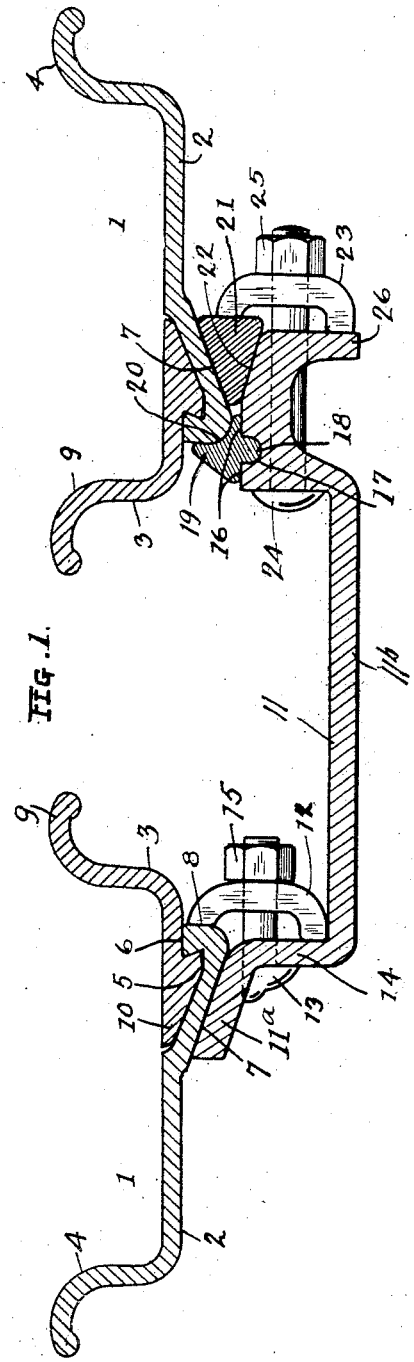

Fig. 1 of the accompanying drawings is a transverse sectional view of a wheel felly and rim assembly constructed in accordance with this invention.

Figure 2:
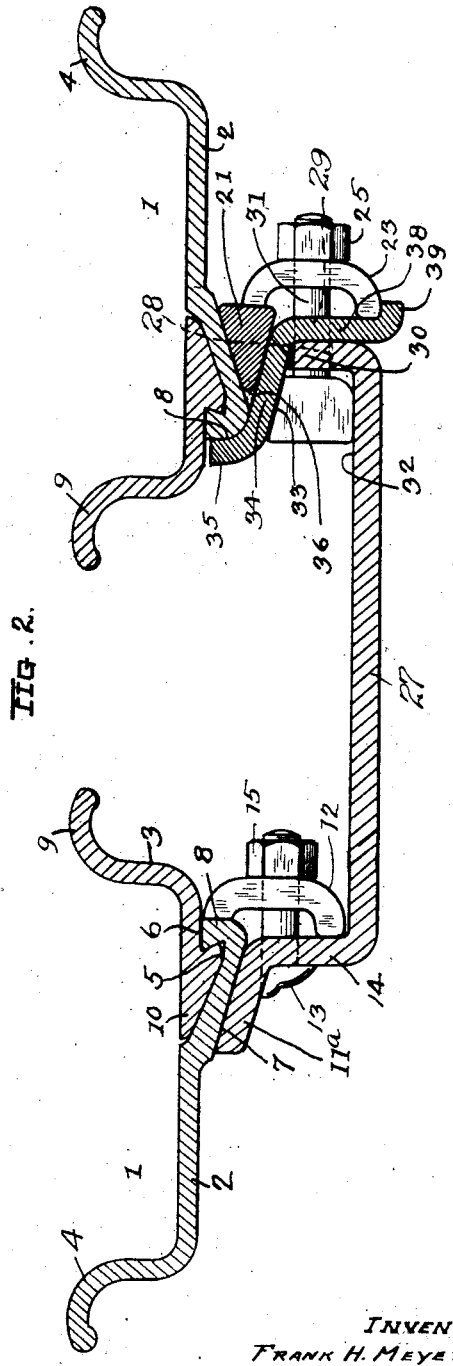

Fig. 2 is a corresponding radial sectional view of a wheel structure, showing a modified form of this invention; and Fig. 3 is a transverse sectional view of a wheel structure illustrating the application of this invention to a metal vehicle wheel.

A preferred form of pneumatic tire-carrying rim 1 is shown in each of the several adaptations of this invention. Each tire-carrying rim preferably comprises a pair of interlocking annular members 2 and 3, the side ring 3 being endless and the base member 2 being transversely split in order that the rim may be quickly and easily assembled or disassembled. The base member 2 is provided with a tire retaining flange 4 at its outer edge and an outwardly open depressed annular channel 5 formed in its inner edge portion the outer wall of which terminates in an upstanding annular shoulder 6. The side walls of the channel 5 are inclined at an oblique angle. The inner wall of the channel has an inclined inner face 7 that constitutes the rim seat and that is arranged to engage a complementary portion of the wheel structure. The outer face of the side wall 8 of the channel 5 provides a shoulder that is adapted to be engaged by suitable rim clamping means, later to be described, to maintain the rim in position on the wheel structure.

The endless side ring 3 of the rim structure comprises an outwardly extending tire retaining flange 9 that is formed along its outer marginal portion and an inwardly extending flange 10 that is adapted to interlock with the channel 5 of the base member 2 to maintain the rim parts in assembled relation.

The wheel felly 11 shown in Fig. 1 is adapted to be used in connection with any desired form of vehicle wheel. It may either be mounted directly on the spokes or the fixed rim of the wheel or supported from a disc wheel or it may be mounted on a metal spoke wheel. The particular felly shown in Fig. 1 preferably is made from a hot rolled section. The inner edge of the felly, with reference to the vehicle upon which such a wheel structure is mounted, is provided with a raised frusto-conical rim supporting seat $11^a$ upon which the rim 1 is secured by suitable clamps 12 of any suitable form. The clamps 12 are respectively secured in position by studs 13 that are carried by the upstanding flange 14 that carries the rim seat $11^a$. Suitable clamping nuts 15 serve to force the rim 1 into rigid seating relation on the rim seat of the felly.

The outer edge portion of the felly is spaced from the inner edge portion by a cylindrical web $11^b$ and has a circumferential seating face 16 of smaller diameter than the inner diameter of the seating portion of the rim. A portion of the seating face 16 is formed on each side of an annular channel 17 that is adapted to receive an inwardly extending tongue 18 that is formed on the inner face of a transversely split adaptor ring 19. One face of the adaptor ring has a seat 20 formed therein that is adapted to receive the radially inner shoulder of the channel portion of the rim base 2. The seat 20 of the adaptor ring constitutes a stop against which the rim seats which definitely positions the outer rim with respect to the inner rim. A transversely split wedge ring 21 of conventional design engages the seating face 7 of the outer rim and the oppositely inclined seating face 22 of the felly to rigidly support the outer rim 1 on the felly when clamping members 23 are forced against the wedge ring by suitable through bolts 24 and co-operating clamping nuts 25. The inner ends of the clamping members 23 engage a depending flange 26 that is formed on the felly.

Wheel structures constructed in the manner shown in Fig. 1 are assembled by first mounting the inner rim 1 in position on the inclined rim seating face 7 of the felly and then securing the rim in place by tightening the clamping nuts 15 on the studs 13 to force the clamps 12 against the shoulder 8 of the rim. The rim 1 is of greater internal diameter than the seating faces 16 and 22 of the outer edge portion of the felly, and therefore, readily passes over the outer portion of the felly when the outer rim and the associated adaptor ring 19 and wedge ring 21 are removed.

The split wedge ring 19 is next placed in position by inserting the tongue 18 into the circumferential channel 17 of the felly and springing the slit ring over the seat 22 into proper seating relation with the felly. The inherent contractile resiliency of the adaptor ring maintains it in position on its seat on the felly. The outer rim assembly 1 is next seated against the shoulder 20 of the adaptor ring and the rim is secured in place by forcing the wedge ring 21 into rigid seating engagement with the cooperating inclined seating faces of the rim and the felly.

Particular attention is invited to the fact that the tire receiving rims, when thus assembled on the felly structure, are mounted in opposed relation. By supporting each of the rims from a supporting seat that is located substantially to one side of the median plane of the rim, a structure is obtained which, in cooperation with the general form of felly herein provided, will automatically space rims of any of the standard conventional widths the proper distance for the particular size of tires carried by the rims. The tire spacing thus provided is substantially that prescribed by standard tire and rim specifications to which reputable rim and wheel manufacturers conform.

Fig. 2 of the accompanying drawings illustrates a form of felly 27 that may be conveniently manufactured by a cold rolling process, as distinguished from the hot rolled section that is necessary in the structure which is specifically described in connection with Fig. 1. The modification of my invention that is illustrated in Fig. 2 contemplates a felly that is provided along its inner edge portion with a rim seating means of substantially the same character as that described in connection with Fig. 1 and the parts of which are similarly numbered. The outer rim supporting structure of the felly shown in Fig. 2 is however, of somewhat different construction from that illustrated in connection with Fig. 1. The marginal edge portion of the felly shown in Fig. 2 is outwardly turned to provide an annular upstanding flange 30 having radial slots 28 formed therein at intervals to receive clamping bolts 31, each of which has a head portion that exerts wedging action between the outer face 32 of the felly and the inner face 33 of the annular adaptor ring 34. One side of the head of the bolt 31, conforms to the outer face of the felly and is adapted to seat thereagainst and the other side of the bolt head has an inclined wedging face that exerts an outward wedging action against the annular adaptor ring 34 when the nut 25 is moved against the rim clamping member 23.

The annular adaptor ring that is employed in connection with this structure, preferably comprises an outstanding annular flange 35 against which the face 8 of the rim 1 seats and is definitely positioned, an intermediate inclined web portion having a frusto-conical seating face 36 formed on its radially outer portion to engage the wedge ring 21 and a corresponding internal frusto-conical seating face 33 adapted to engage the wedge face of the head of the bolt 31, and an inwardly extending radial flange 38 that terminates in an outwardly extending lip 39 forming a seat against which the clamping members 23 are adapted to seat. The adaptor ring 34 is preferably of uniform thickness being conveniently manufactured by cold rolling process. The adaptor ring may either be endless or may be transversely split.

The assembly and disassembly of the wheel structure described in connection with Fig. 2 is accomplished in substantially the same manner as the assembly and disassembly of the rim structure described in connection with Fig. 1. The mounting structure for the inner rim 1 is substantially the same structure as that shown in Fig. 1 and is assembled in exactly the same way. The outer rim structure, however, differs somewhat from the structure described in connection with Fig. 1 and, therefore, the method of assembling this portion of the wheel structure will be described.

The adaptor ring 34 and the transverse bolts 31 are first mounted in position substantially as shown in the assembly view of Fig. 2. This assembly is readily accomplished since the upstanding flange 30 of the felly has a series of slots 28 formed at various locations in its periphery that are adapted to receive the shank of the corresponding clamping bolts 31. The adaptor ring 34 has correspondingly positioned bolt-receiving holes 29 that register with the slots 28 formed in the upstanding flange 30 of the felly providing holes through which the bolts 31 may be conveniently inserted. After the adaptor ring 34 is in position and the through bolts 31 have been inserted, the outer rim 1 is mounted in convenient manner upon the adaptor ring by means of the split wedge ring 21 and the clamping members 23 that serve to force the wedge ring 21 into wedging relation with the inclined wedge face of the rim 1 and the inclined face of the adaptor ring 34. The pressure that is exerted on the bolt 31 by the tightening of the nut 25 also draws the head of the bolt in wedging contact with the inclined face 33 of the adaptor ring and thereby provides wedging action between the face 32 of the felly and the inner face of the endless or split adaptor ring 34.

An additional adaptation of our invention is illustrated in Fig. 3 which shows a modification of this invention as applied to a wheel structure that does not include a felly of the type illustrated in Figs. 1 and 2.

The wheel structure illustrated in Fig. 3 comprises a body portion 40 that has a pair of spaced outwardly extending disc elements 41 and 42 that are respectively adapted to support a tire-receiving rim on their outer peripheral faces. The disc element 41 has an inclined rim seating face 43 formed on its outer marginal edge portion that corresponds closely to the inclined rim seating portion 11 of the felly described in connection with Fig. 1 and, since it functions in substantially the same way as the rim seating portion described in connection with Fig. 1, the various elements of the rim mounting shown in Fig. 3 are correspondingly numbered.

The outer peripheral edge portion of the disc 42 has an inclined frusto-conical seating face 44 of less diameter than the minimum internal diameter of the rim adapted to be mounted on the wheel assembly. A transversely split adaptor ring 45 of a form closely corresponding to the adaptor ring described in connection with Fig. 2 is adapted to seat on the supporting face 44 of the wheel structure. A split wedge ring 46, having bolt-receiving lug portions 47 formed thereon, is used in connection with this assembly although the type of split wedge ring and clamping mechanism shown in the corresponding portion of Fig. 2 could also be used in connection therewith. The disc 42 of the wheel structure has a seating face 48 that is adapted to engage the inner terminal portions of each of the lugs 47 to insure proper wedging action between the lug and the wedging portion of the ring 46 that engages the inner inclined seating face 7 of the rim and the outer inclined seating face 49 of the adaptor ring to rigidly hold the rim 1 in secure position on the wheel disc 42. The inclined face 44 of the disc 42, being of lesser diameter than the innermost diameter of the rim 1, permits the rim that is mounted on the disc 41 to pass over the disc portion 42 to seating position on the disc 41. The wedging ring 46 is forced into place by a plurality of nuts 50 that are mounted on transversely extending threaded lugs 51.

The assembly of this wheel structure is substantially the same as the assembly of the wheel structures previously described. The innermost rim structure is first mounted on the wheel disc 41 in a manner that will be understood from the prior discussion. The transversely split adaptor ring 45 is then seated on the inclined face 44 of the disc 42 and the rim assembly 1 is mounted on the adaptor ring in opposed relation to the rim that is secured on the disc 41. The transversely split wedge ring 46 is then inserted in position and the clamping nuts 50 drawn down upon their corresponding bolts 51 to force the wedging surfaces of the ring 46 between the seating surface of the rim 1 and the inclined face 49 of the transversely split adaptor ring. The wedging action exerted by the ring 46 forces the adaptor ring 45 into clamping relation with the inclined face 44 of the disc 42 and rigidly secures the rim assembly 1 in position on the wheel structure.

Although only a few preferred modifications of this invention are herein illustrated, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. A rim seating mechanism for a vehicle wheel comprising a felly having a depressed annular seat formed thereon adjacent an upstanding flange, an adaptor ring of substantially the same thickness throughout having a depending flange adapted to seat laterally against said upstanding flange and a laterally extending tapered body portion formed adjacent the flange and providing an inclined rim supporting seat on its peripheral face, clamping bolts having enlarged head portions of substantially the same taper as the body portion of said ring and adapted to seat on the inner face thereof and upon the depressed annular seat of said felly, said bolts each having shank portions adapted to extend through and well beyond both the upstanding flange of the felly and the adaptor ring to serve as clamping means for securing a rim on said adaptor ring.

2. In a wheel assembly, a member formed with a circumferential seating surface; an annular adapter ring having an inclined body portion seated on the seating surface, an upstanding flange constituting a stop for a rim, and an inwardly extending flange for engagement with the side of the member; and means coacting with the ring for clamping a rim on the member.

3. In a wheel assembly, a member formed with a circumferential seating surface; an annular adapter ring having an inclined body portion seated on the seating surface, an upstanding flange constituting a stop for a rim, and an inwardly extending flange for engagement with the side of the member to provide a seat for clamping lugs for securing a rim on the member; and means coacting with the ring for clamping a rim on the member.

4. In a wheel assembly, a member formed with a circumferential seating surface; an annular adapter ring having an inclined body portion seated on the seating surface, an upstanding flange constituting a stop for a rim, and an inwardly extending flange for engagement with the side of the member; a wedge ring on the adapter; and means carried by the member and coacting with the wedge ring for clamping a rim on the member.

5. In a wheel assembly, a member formed with a circumferential seating surface; an annular adapter ring having an inclined body portion seated on the seating surface, an upstanding flange constituting a stop for a rim, and an inwardly extending flange for engagement with the side of the member; a wedge ring on the adapter; and means carried by the member and coacting with the wedge ring and with the adapter ring for clamping a rim on the member.

6. In a wheel assembly, a felloe comprising a cylindrical portion having a radially extending flange formed with a circumferential seat; an annular adapter ring having an inclined body portion disposed upon the seat, an upstanding flange constituting a stop for a rim, and an inwardly extending flange for engagement with the flange of the felloe; a plurality of bolts traversing the said flange; each bolt having an enlarged head formed with a tapered seat for engagement with the body portion of the adapter; a wedge ring on the adapter; and clamping members carried by the bolts and engaging the wedge ring for securing a rim upon the member.

7. In a wheel assembly, a felloe comprising a cylindrical portion having a radially extending flange formed with a circumferential seat; an annular adapter ring having an inclined body portion disposed upon the seat, an upstanding flange constituting a stop for a rim, and an inwardly extending flange for engagement with the flange of the felloe; a plurality of bolts traversing the said flanges; each bolt having an enlarged head formed with a tapered seat for engagement with the body portion of the adapter; a wedge ring on the adapter; and clamping members carried by the bolts and engaging the wedge ring and the adapter ring for securing a rim upon the member.

8. In a wheel assembly, a felloe comprising a cylindrical portion formed with a radially extending flange apertured for receiving the shanks of clamping lugs; a plurality of clamping lugs each having an enlarged head portion with a tapered outer surface for supporting an adapter ring; an annular adapter ring having an inclined body portion adapted to seat on the outer surface of the lugs, an upstanding flange adapted to form a stop for a rim, and an annular inwardly extending flange adapted to seat against the radially extending flange of the felloe and to provide a seat for clamping elements for securing a rim on the felloe.

In testimony whereof we affix our signatures.

FRANK H. MEYER.
FRED R. KLAUS.